Figure 1:
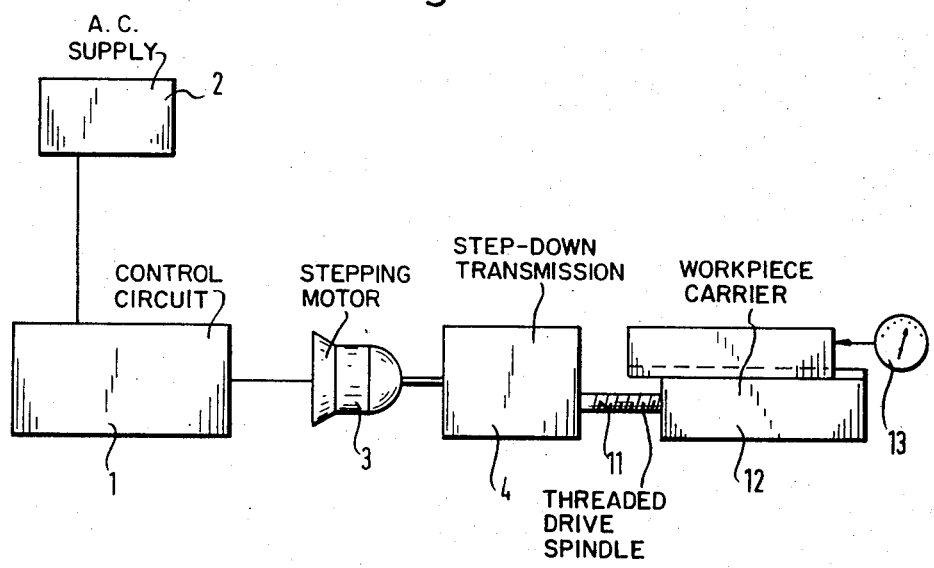

United States Patent

Weinz

[15] 3,641,415
[45] Feb. 8, 1972

[54] OPEN-LOOP STEPPING MOTOR CONTROL CIRCUIT FOR A MACHINE TOOL

[72] Inventor: Ernst A. Weinz, Auf der Bliz, Idar-Oberstein, Germany

[22] Filed: Nov. 14, 1969

[21] Appl. No.: 876,656

[30] Foreign Application Priority Data

Nov. 22, 1968 Germany ..................P 18 10 264.2

[52] U.S. Cl. ..............................................318/696, 318/162
[51] Int. Cl. .....................................................G05b 19/40
[58] Field of Search ...................................318/685, 696, 162

[56] References Cited

UNITED STATES PATENTS

| | | | |
|---|---|---|---|
| 3,218,535 | 11/1965 | Holthaus et al. | 318/685 X |
| 3,280,399 | 10/1966 | Kreinberg | 318/696 X |
| 3,297,929 | 1/1967 | Gardner et al. | 318/696 X |

*Primary Examiner*—T. E. Lynch
*Attorney*—Kurt Kelman

[57] ABSTRACT

A tool or workpiece slide on a machine tool is advanced in uniform steps by an interruptor in the energizing circuit of the motor driving the slide. A counter which counts the steps stops the advancing movement of the slide after a desired movement of the tool or workpiece. The counter may be set manually. The invention resides in features of the motor circuit and associated controls.

1 Claims, 2 Drawing Figures

OPEN-LOOP STEPPING MOTOR CONTROL CIRCUIT FOR A MACHINE TOOL

This invention relates to machine tools, and particularly to control arrangement for the movements of a carrier for a tool or a workpiece, the carrier being guided on the supporting frame of the machine.

It is known to feed a slide or other carrier for a workpiece relative to a tool, or a carrier for a tool relative to a workpiece, in a path which may be linear or angular, an to provide an electric motor as the prime mover for the carrier. This invention is more specifically concerned with a control arrangement which energizes and deenergizes the motor in a predetermined sequence, either semiautomatically or automatically without the intervention of a human operator.

The invention, in one of its aspects provides a control arrangement in which an electromechanical interruptor is arranged in the energizing circuit of the motor for cyclically energizing the motor. Adjusting means are provided for adjusting the frequency of energizing. A pulse counter is operatively connected to the energizing circuit so as to count the energizing cycles of the motor and to generate a counting signal in response to a selected number of counted cycles. A first series-arranged switch in the energizing circuit is operated by a relay in an auxiliary circuit. A second switch, series-connected to the relay in the auxiliary circuits, is connected to the counter and interrupts the auxiliary circuit in response to the aforementioned counting signal.

The auxiliary circuit may also include a starting switch for the relay and holding contacts for keeping the relay energized when started.

Figure 2:
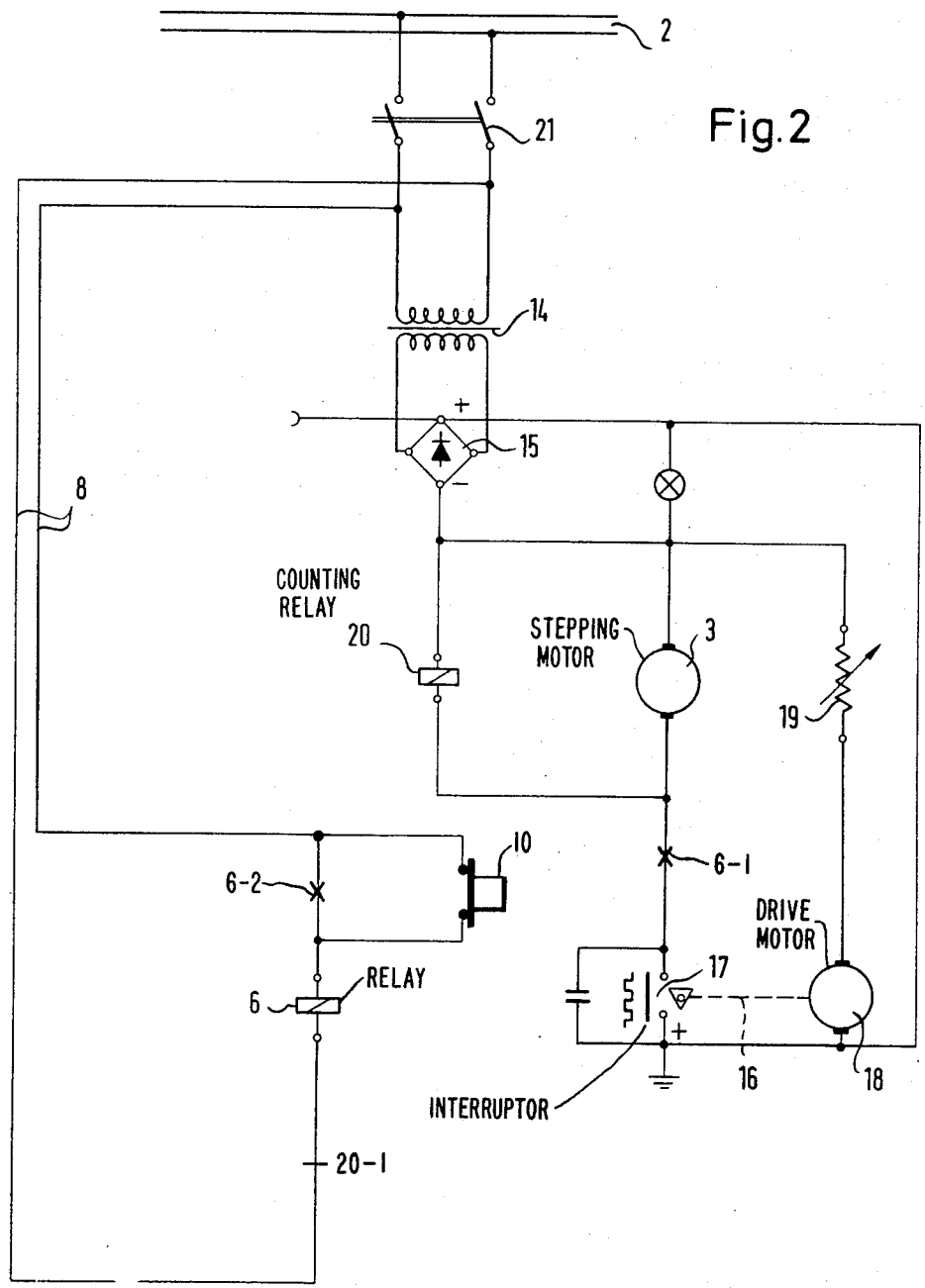

Other features, additional objects, and many of the attendant advantages of this invention will readily become apparent from the following detailed description of a preferred embodiment when considered in connection with the appended drawing, in which:

FIG. 1 illustrates a slide indexing arrangement on a machine tool in partly diagrammatic, and partly elevational view; and FIG. 2 is a schematic of the electrical motor controls for the indexing arrangement.

Referring initially to FIG. 1, there is shown much of a drill press equipped with a work carrier indexed according to this invention, as is necessary for an understanding of the invention.

A control circuit 1 receives electric energy from a current supply 2 and its output is fed to a stepping motor 3. The output shaft of the motor is coupled to the input shaft of a stepdown transmission 4 and the output shaft of the transmission is connected to a threaded drive spindle 11 for a slide or work carrier device 12. The work carrier is moved steps whose magnitude can be read from a dial gage 13. The stepping motor 3 is a staple article of commerce. It may be equipped with magnets which turn the output shaft by one step when energized.

FIG. 2 is a schematic of the elements in the control circuit 1 and of associated elements. The current supply 2 is a source of single-phase house current which may be interrupted by a main switch 21. A transformer feeds a full-wave rectifier 15, and the low-voltage, direct current so produced is fed to the energizing circuit of the stepping motor 3. Conductors 8 supply an auxiliary circuit with 110 volt alternating current.

The motor 3 is arranged in series with the normally open switching contacts 6-1 of a relay whose coil 6 is arranged in the auxiliary circuit in series with switching contacts 20-1 of a counting relay 20, the counting relay being arranged in parallel circuit with the motor 3. The auxiliary circuit furthermore includes a manually operated, normally open push button switch 10 for starting the control apparatus, and normally open holding contacts 6-2 of the relay 6 in parallel circuit with the switch 10 to keep the controls operating when switch 10 is released.

The energizing circuit of the motor 3 furthermore includes the series connected contacts 17 of an interruptor 16. A drive motor 18 of a type commonly employed in windshield wipers and sewing machines cyclically opens and closes the contacts 17 at a frequency which may be adjusted by means of rheostat 19 which connects the motor 18 to the rectifier 15.

When it is desired to advance the carrier 4 in uniform steps at desired uniform intervals, the counting relay 20 is set for the desired number of steps, the rheostat 19 is set for the intervals or the frequency at which the energizing circuit of the motor 3 is closed, the main switch 21 is closed to start the interruptor motor 18, and the push button 10 is depressed, thereby energizing the relay coil 6 and closing the contacts 6-2 and 6-2. The motor 3 is cyclically energized to shift the slide or work carrier 12 in equal increments, and the counting relay 20 opens the contacts 20-1 when the motor 3 has performed the set number of operating cycles. The coil 6 is deenergized and the contacts 6-1 in the circuit of the motor 3 are opened.

Obviously, the arrangement illustrated in the drawing and more specifically described above is not limited in its applications to a drill press, nor is the carrier 12 limited to supporting a workpiece in a machine tool. It could be employed without further changes for advancing a tool toward a workpiece, and other uses in machine tools will readily suggest themselves to those skilled in the art.

Devices of the invention have been employed successfully in machines for engraving linear or arcuate scales. Individual increments as small as 1 $\mu$m. have been transmitted to the carrier with great precision when ball bearings where employed between all movable elements of the mechanical portion of the apparatus.

The apparatus has also been used successfully in the grinding of diamonds. Several diamonds were adhesively fastened to respective supporting spindles which were turned by the motor 3 through a stepdown transmission between the grinding of individual facets on the diamonds.

It should be understood therefore that the foregoing disclosure relates only to a preferred embodiment of the invention, and that is intended to cover all changes and modifications of the examples of the invention herein chosen for the purpose of the disclosure which do not constitute departures from the spirit and scope of the invention set forth in the appended claims.

What is claimed is:

1. A control circuit for a machine tool of the type wherein a workpiece carrier is moved, relative to a tool, in a series of incremental steps, which comprises:
   1. means for supplying an alternating potential from an external source;
   2. an AC relay connected to said supplying means, said relay having first and second normally open contacts;
   3. a starting switch, serially connected with the coil of said AC relay to complete a circuit thereto when closed, said first normally open contacts of said AC relay being wired in parallel with said switch to provide a lockup of said relay when said switch is opened;
   4. a transformer connected to said supplying means and having a full-wave bridge rectifier connected to the secondary thereof to supply a source of DC potential;
   5. a series circuit connected across said source of DC potential comprising a stepping motor operatively connected to said workpiece carrier, the second, normally open contacts of said AC relay, and the contacts of an electro mechanical interrupter;
   6. a driving motor connected to said source of DC potential and coupled to said electromechanical interrupter to periodically open and close the contacts thereof;
   7. a rheostat, serially connected with said driving motor across said source of DC potential, to adjust the frequency at which said interrupter contacts open and close; and
   8. a counting relay, connected in parallel with said stepping motor, to count the number of times said electromechanical interrupter has interrupted the energization of said stepping motor, said counting relay having a normally closed contact in series with said AC relay, whereby when said counting relay has counted some predetermined number of interruptions, said normally closed relay contacts open, thereby releasing said AC relay and thus opening, in turn, said normally opened second contacts in series with said stepping motor and thus preventing further energization thereof.